UNITED STATES PATENT OFFICE.

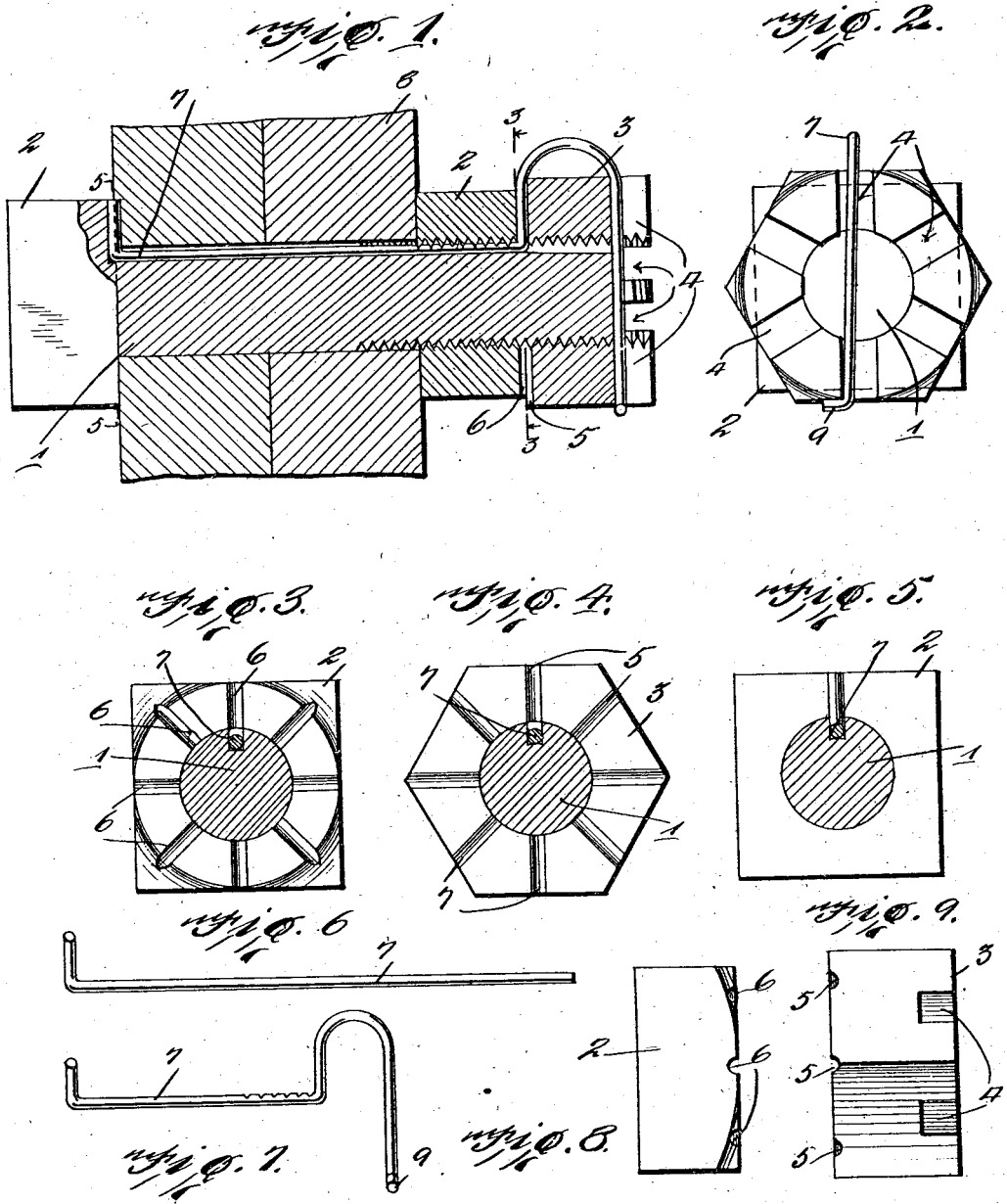

JOHN OBERDIER, OF MOUNT GILEAD, OHIO.

NUT-LOCK.

1,194,060.

Specification of Letters Patent.

Patented Aug. 8, 1916.

Application filed March 7, 1916. Serial No. 82,751.

*To all whom it may concern:*

Be it known that I, JOHN OBERDIER, a citizen of the United States of America, residing at Mount Gilead, in the county of Morrow and State of Ohio, have invented certain new and useful Improvements in Nut-Locks, of which the following is a specification, reference being had therein to the accompanying drawing.

This invention relates to bolts and nut locks and has for its principal object the production of a simple and efficient means for preventing the nut from accidentally rotating upon the bolt.

Another object of this invention is the production of a simple and efficient key which is adapted to engage the bolt and nut in such a manner as to prevent the nut from rotating upon the bolt.

A still further object of this invention is the production of a nut provided with notches, and a bolt provided with a groove for receiving the peculiarly shaped key.

With these and other objects in view this invention consists of certain novel combinations, constructions, and arrangements of parts as will be hereinafter fully described and claimed.

In the accompanying drawing:—Figure 1 is a section taken through the device showing the bolt partly in elevation. Fig. 2 is a top plan view of the device. Fig. 3 is a section taken on the line 3—3, of Fig. 1 looking in the direction of the arrows. Fig. 4 is a plan view of the inner face of the primary nut showing the key and bolt in section. Fig. 5 is a section taken on the line 5—5, of Fig. 1 looking in the direction of the head of the bolt. Fig. 6 is a side elevation of the key. Fig. 7 is a side elevation of the key showing the same as used. Fig. 8 is a side elevation of the secondary nut. Fig. 9 is a side elevation of the primary nut.

By referring to the drawing by numerals it will be seen that 1 designates the bolt which is provided with the head 2. This head 2, as is clearly shown in Fig. 5, is provided with a notch upon its inner face. The bolt is provided with a groove running parallel with the axis of the bolt. This device also comprises the primary nut 3 and the secondary nut 2. The primary nut is provided with notches 4 upon its outer face, and a plurality of notches 5 upon its inner face. The secondary nut 2 is provided with a plurality of notches 6 upon its outer face only.

When this device is used, the key 7 is first placed in the longitudinally extending groove of the bolt and the notch provided upon the inner face of the head of the bolt, after which the secondary nut is screwed upon the bolt, and it will be seen by referring to Fig. 1 that this nut 2 is adapted to bite into the key. After the nut 2 is snug against the object 8, the key is bent parallel and into the notches 6, after which the primary nut is screwed upon the bolt so that the key will register into the notches 5. After the primary nut is positioned upon the bolt, the key is bent over so as to fit into the notches 4 as is clearly shown in Fig. 2. The key is then bent so as to provide a lip 9 which will extend parallel with one portion of the periphery of the nut, so that the key will be prevented from accidentally pulling out of the slots 4.

It, of course, should be noted that the groove provided upon the bolt is of the same depth as the thickness of the key, so that the secondary nut 2 will cut threads into the same.

From the above description it will be seen that a very simple and efficient means has been provided, whereby a key may be fitted in a groove of the bolt and bent into notches provided upon the nuts. It will also be seen that the key is bent so as to provide the lip 9, so that any tendency of the key pulling out of the notches 4 will be efficiently obviated.

It should be noted that the plurality of notches provided in the nuts may be of any shape desired and also that more than one groove may be provided upon the body of the bolt 1, and more than one notch in the head of the bolt so that more than one key may be used. It should also be noticed that the key may be square, round, or any other desired shape in cross-section.

It is, of course, obvious that any change may be made which does not depart from the spirit of the invention as claimed, and which will conform with the above description, and consequently, I do not limit myself to the device as described but to the claim.

Having thus described the invention what is claimed as new, is:—

In a device of the class described the combination of a bolt, the head of said bolt provided with a notch, the body of said bolt provided with a longitudinal groove, primary and secondary nuts adapted to screw upon said bolt, both faces of said primary nut provided with notches, the outer face of said secondary nut provided with notches, and a key adapted to be bent so as to fit in the notch provided upon the head of said bolt and in the groove of said bolt and in the notches provided upon said nuts whereby said nuts will be prevented from rotating upon said bolt.

In testimony whereof I hereunto affix my signature.

JOHN OBERDIER.